US012358017B2

(12) United States Patent
Sloat et al.

(10) Patent No.: US 12,358,017 B2
(45) Date of Patent: Jul. 15, 2025

(54) METHOD AND SYSTEM FOR FORMING A PACKAGING MATERIAL

(71) Applicant: Graphic Packaging International, LLC, Atlanta, GA (US)

(72) Inventors: Jeffrey T. Sloat, Broomfield, CO (US); Corey Desmond Crooks, Erie, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 391 days.

(21) Appl. No.: 17/825,069

(22) Filed: May 26, 2022

(65) Prior Publication Data

US 2022/0379342 A1 Dec. 1, 2022

Related U.S. Application Data

(60) Provisional application No. 63/194,418, filed on May 28, 2021.

(51) Int. Cl.

| | |
|---|---|
| ***B05D 3/08*** | (2006.01) |
| ***B05D 3/00*** | (2006.01) |
| ***B05D 3/02*** | (2006.01) |

(52) U.S. Cl.

CPC ............... *B05D 3/08* (2013.01); *B05D 3/002* (2013.01); *B05D 3/007* (2013.01); *B05D 3/0254* (2013.01); *B05D 2201/04* (2013.01); *B05D 2252/02* (2013.01); *B05D 2350/30* (2013.01)

(58) Field of Classification Search

CPC .......... B05D 3/08; B05D 3/002; B05D 3/007; B05D 3/0254; B05D 2201/04; B05D 2350/30

See application file for complete search history.

(56) References Cited

U.S. PATENT DOCUMENTS

| | | | |
|---|---|---|---|
| 1,140,288 | A | 5/1915 | Robinson |
| 1,992,222 | A | 2/1935 | LaGrua |
| 2,259,822 | A | 10/1941 | Kienlen |
| 2,493,337 | A | 1/1950 | Buttery |
| 2,828,060 | A | 3/1958 | Brown |
| 2,852,180 | A | 9/1958 | Inman |

(Continued)

FOREIGN PATENT DOCUMENTS

| | | |
|---|---|---|
| EP | 0 943 548 | 9/1999 |
| JP | 2003-089170 A | 3/2003 |

(Continued)

OTHER PUBLICATIONS

Lahti, Johanna et al., The Effects of Corona and Flame Treatment: Part 1, PE-LD Coated Packaging Board, 2007 European Place Conference, 2007, 15 pages.

(Continued)

*Primary Examiner* — Nathan T Leong

(74) *Attorney, Agent, or Firm* — FisherBroyles, LLP

(57) ABSTRACT

A method for forming a resultant material. The method can include obtaining a base material including a fibrous material with a plurality of fiber portions extending from a face of the base material. The method further can include treating at least the face of the base material, the treating at least the face including applying heat along at least a portion of the face with a treatment unit to at least partially remove the plurality of fiber portions extending from the face.

18 Claims, 4 Drawing Sheets

(56) References Cited

U.S. PATENT DOCUMENTS

| | | | |
|---|---|---|---|
| 2,881,968 | A | 4/1959 | Inman |
| 2,884,180 | A | 4/1959 | Inman |
| 2,936,104 | A | 5/1960 | DeBlaere |
| 2,992,767 | A | 7/1961 | Inman |
| 2,998,180 | A | 8/1961 | Dehoney, Jr. |
| 3,015,432 | A | 1/1962 | Tyrseck |
| 3,083,889 | A | 4/1963 | Christensson |
| 3,110,436 | A | 11/1963 | Wagner |
| 3,113,713 | A | 12/1963 | Green |
| 3,163,347 | A | 12/1964 | Bixler |
| 3,182,887 | A | 5/1965 | Larson |
| 3,194,474 | A | 7/1965 | Rumerger |
| 3,261,536 | A | 7/1966 | Bixler |
| 3,269,635 | A | 8/1966 | Bergstein et al. |
| 3,878,771 | A | 4/1975 | Malcolm |
| 3,883,068 | A | 5/1975 | Silver |
| 3,912,156 | A | 10/1975 | May |
| 3,944,127 | A | 3/1976 | Bruke et al. |
| 4,055,672 | A | 10/1977 | Hirsch et al. |
| 4,063,679 | A | 12/1977 | Henry |
| 4,099,665 | A | 7/1978 | Bergstein |
| 4,121,753 | A | 10/1978 | Westfall |
| 4,169,540 | A | 10/1979 | Larsson et al. |
| 4,254,173 | A | 3/1981 | Peer, Jr. |
| 4,313,553 | A | 2/1982 | Lisiecki |
| 4,380,447 | A | 4/1983 | VanderLugt, Jr. |
| 4,495,209 | A | 1/1985 | Whiteside |
| 4,499,998 | A | 2/1985 | Carlson |
| 4,736,870 | A | 4/1988 | Christensson |
| 4,762,234 | A | 8/1988 | Wyberg |
| 4,915,289 | A | 4/1990 | Hatano et al. |
| 4,997,104 | A | 3/1991 | Pohl |
| 5,083,671 | A | 1/1992 | Hayes |
| 5,106,015 | A | 4/1992 | Vlasaty et al. |
| 5,211,305 | A | 5/1993 | Horton |
| 5,228,616 | A | 7/1993 | Kjelgaard |
| 5,255,494 | A | 10/1993 | Doyle |
| 5,350,110 | A | 9/1994 | Will |
| 5,501,394 | A | 3/1996 | Eno |
| 5,728,249 | A | 3/1998 | Kinsey, Jr. et al. |
| 5,816,487 | A | 10/1998 | Skinner |
| 5,848,749 | A | 12/1998 | Ljungstrom |
| 5,988,494 | A | 11/1999 | Fontaine |
| 6,105,857 | A | 8/2000 | Markey et al. |
| 6,227,367 | B1 | 5/2001 | Harrelson et al. |
| 6,364,199 | B1 | 4/2002 | Rose |
| 6,390,358 | B1 | 5/2002 | Stewart et al. |
| 6,688,515 | B1 | 2/2004 | Huffman et al. |
| 6,957,763 | B2 | 10/2005 | Huffman et al. |
| 7,665,653 | B2 | 2/2010 | Fitzwater |
| 8,220,701 | B2 | 7/2012 | Fontaine et al. |
| 2003/0197051 | A1 | 10/2003 | Muise et al. |
| 2004/0164134 | A1 | 8/2004 | Gong et al. |
| 2006/0255106 | A1 | 11/2006 | Green |
| 2017/0260416 | A1 * | 9/2017 | Joyce ..................... D21H 19/28 |
| 2018/0312314 | A1 | 11/2018 | Portrey |

FOREIGN PATENT DOCUMENTS

| | | | |
|---|---|---|---|
| JP | 2016-079533 | A | 5/2016 |
| KR | 10-2005-0002908 | A | 1/2005 |
| KR | 10-0616728 | B1 | 8/2006 |
| KR | 10-2014-0096281 | A | 8/2014 |
| WO | WO 01/83118 | A1 | 11/2001 |
| WO | WO0183118 | * | 11/2001 |
| WO | WO 03/080932 | A1 | 10/2003 |
| WO | WO 2013/053997 | A1 | 4/2013 |
| WO | WO 2019/239334 | A1 | 12/2019 |
| WO | WO 2020/115667 | A1 | 6/2020 |

OTHER PUBLICATIONS

International Search Report and Written Opinion for PCT/US2022/031009 dated Sep. 19, 2022.

* cited by examiner

METHOD AND SYSTEM FOR FORMING A PACKAGING MATERIAL

CROSS-REFERENCE TO RELATED APPLICATIONS

This application claims the benefit of U.S. Provisional Patent Application No. 63/194,418, filed on May 28, 2021.

INCORPORATION BY REFERENCE

The disclosure of U.S. Provisional Patent Application No. 63/194,418, which was filed on May 28, 2021, is hereby incorporated by reference for all purposes as if presented herein in its entirety.

BACKGROUND OF THE DISCLOSURE

The present disclosure generally relates to packaging materials and systems and methods for making packaging materials that may include a fibrous base material and a film formed on the base material and may be formed into constructs such as blanks, cartons, press-formed constructs, or the like.

SUMMARY OF THE DISCLOSURE

In general, one aspect of the disclosure is directed to a method for forming a resultant material. The method can comprise obtaining a base material comprising a fibrous material with a plurality of fiber portions extending from a face of the base material. The method further can comprise treating at least the face of the base material, the treating at least the face comprising applying heat along at least a portion of the face with a treatment unit to at least partially remove the plurality of fiber portions extending from the face. Also, in some embodiments, the method can comprise applying a coating layer to the face of the base material.

In another aspect, the disclosure is generally directed to a system for forming a resultant material. The system can comprise a treatment unit applying heat to at least a portion of a face of a base material, the base material having a plurality of fiber portions extending from the face, and the treatment unit at least partially removing the plurality of fiber portions. In some embodiments, the system further can comprise a coating apparatus applying a coating to the face of the base material.

In another aspect, the disclosure is generally directed to a method for forming a resultant material. The method can comprise obtaining a base material and applying a coating layer to the base material to form an initial coated material, the coating layer extending along a surface of the initial coated material. The method further can comprise treating at least a portion of the initial coated material to form the resultant material. The treating at least a portion of the initial coated material comprising applying localized heat to at least a portion of the coating layer along the surface of the initial coated material with a treatment unit to at least partially modify the coating layer.

In another aspect, the disclosure is generally directed to a system for forming a resultant material. The system can comprise a coating apparatus applying a coating layer to a base material to form an initial coated material with the coating layer extending along a surface of the initial coated material. The system further can comprise a treatment unit applying localized heat to at least a portion of the coating layer along the surface of the initial coated material for at least partially modifying the coating layer.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure. The drawings are schematic and exemplary only, and should not be construed as limiting the invention.

Corresponding parts are designated by corresponding reference numbers throughout the drawings.

DETAILED DESCRIPTION OF THE EXEMPLARY EMBODIMENTS

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the invention.

One aspect of this disclosure is the provision of systems and methods for providing a web of packaging material, wherein the packaging material may be formed into a beverage cup, a tray, a bowl, a carton, and/or another suitable container or construct for holding or packaging one or more articles (e.g., for storage, transporting, heating, cooking, consuming food products and/or beverages, and/or other suitable uses). In one example, the packaging material can be formed into a construct for use in cooking and/or reheating food in a microwave oven and can include microwave transparent and/or microwave energy interactive materials.

Figure 1A:
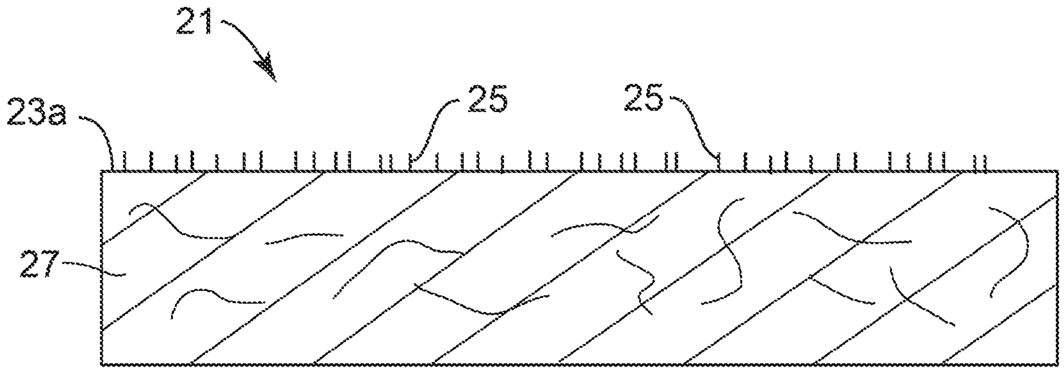
FIG. 1A is a schematic cross-sectional view of a base material or substrate for being formed into a packaging material in accordance with a first exemplary embodiment of the disclosure.

FIG. 1A schematically illustrates a substrate or base material 21, which can be treated and/or can be coated with a coating layer 33 to form a resultant coated material 35 (schematically shown in FIG. 1C), such as by a system 20 (schematically shown in FIG. 1D) or any other suitable system. In the illustrated embodiment, the base material 21 can include a fibrous material (e.g., paperboard and/or other suitable materials) with a face 23*a* (e.g., pretreatment face 23*a*). In one embodiment, the base material 21 schematically shown in the figures can be a portion of an initial web of material, which can be coated, laminated, and/or otherwise processed to form a packaging material (e.g., a web of packaging material or other suitable resultant material). In exemplary embodiments, the packaging material can be cut into blanks and/or other suitable constructs, and the blanks can be formed into cups, trays, bowls, cartons, and/or other suitable containers.

In the illustrated embodiment, the face 23*a* of the base material 21 can be uncoated and unlaminated, and a plurality of fiber portions 25 (e.g., "stray fibers") can extend from the face 23*a*. In one embodiment, the base material 21 can include fibers that mostly extend within the interior 27 of the base material 21 while portions (e.g., end portions) of some portion of the fibers can extend at least partially away from the interior of the base material 21 at one or more faces/surfaces of the base material 21. While the fiber portions 25 are shown as extending upwardly from the face 23*a* of the base material 21 in the schematic view of FIG. 1A, the fiber portions 25 can extend upwardly and/or in any other direction from the face 23*a* of the fibrous material of the initial web 21. In some embodiments, the fiber portions 25 can extend through a coating applied to the face 23*a* (as discussed in more detail below), which can provide channels or pathways for liquids (e.g., oils, grease, water, etc.) to pass through the coating and into the interior 27 of the base material 21 (e.g., by being absorbed/wicked by the fiber portions 25). In embodiments, the face of the base material 21 that is opposite to the face 23*a* could be similar or identical to the face 23*a* and/or could be laminated and/or coated (e.g., by a polymer and/or metallic film, a clay coating, etc.) and/or could be attached (e.g., adhered) to additional layers of material (e.g., additional layers of paperboard and/or other materials). The base material 21 could be otherwise shaped, arranged, configured, and/or positioned without departing from the disclosure.

Figure 1B:
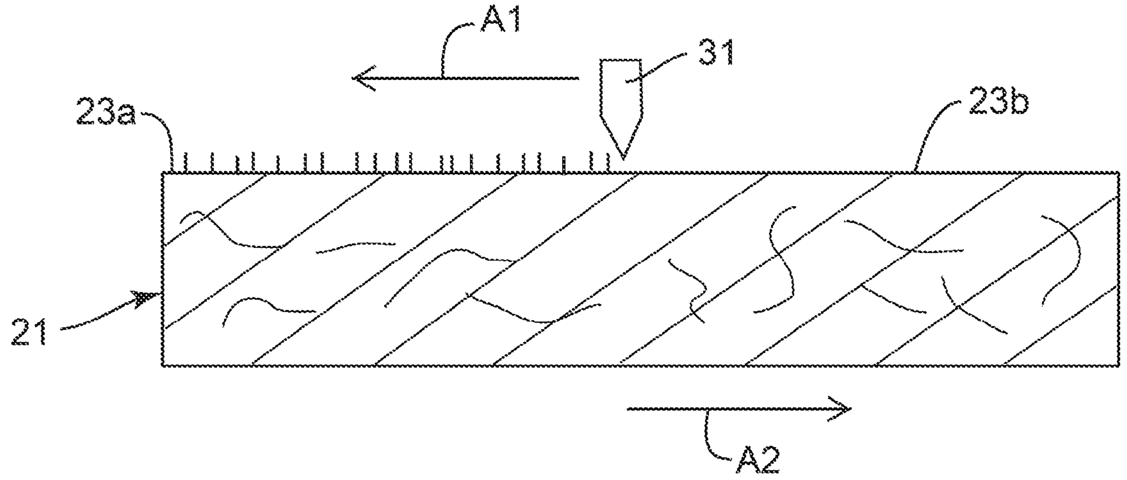
FIG. 1B is a schematic cross-sectional view of the base material of FIG. 1A being treated with a treatment unit according to the first exemplary embodiment of the disclosure.
Figure 1C:
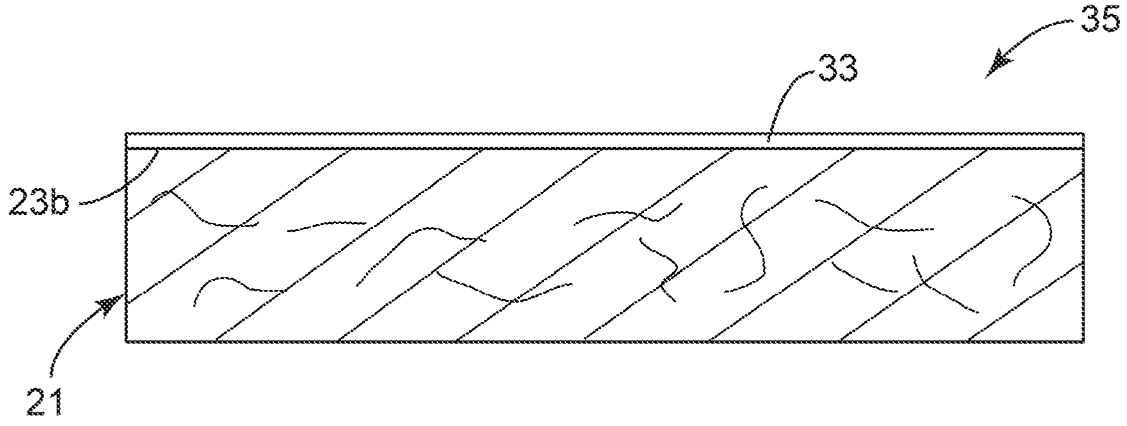
FIG. 1C is a schematic cross-sectional view of a resultant coated material formed from at least the base material of FIGS. 1A and 1B and a coating layer according to the first exemplary embodiment of the disclosure.
Figure 1D:
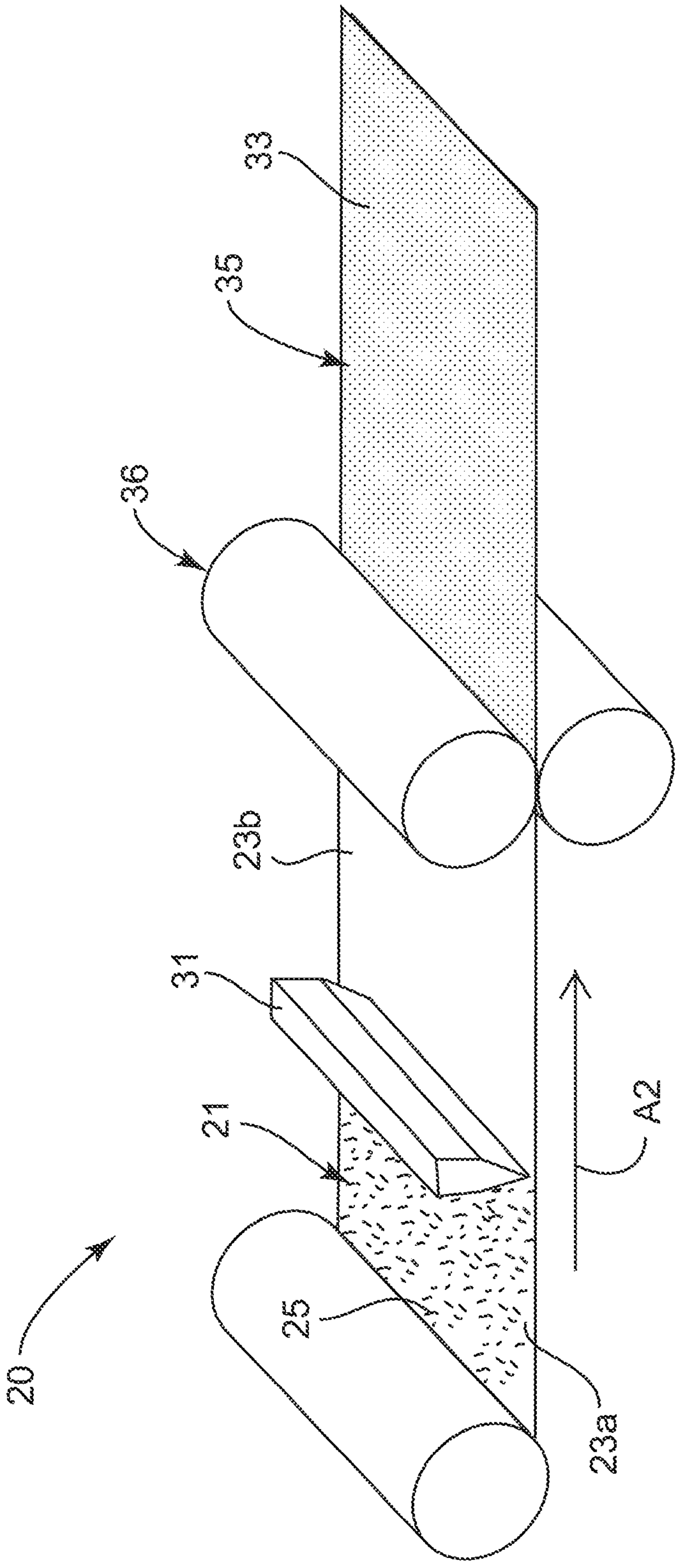
FIG. 1D is a schematic view of a system for treating a base material and for forming a resultant material according to the first exemplary embodiment of the disclosure.

As schematically shown in FIGS. 1B and 1D, the base material 21 can be processed or treated to reduce or at least partially eliminate the fiber portions 25 extending from the face 23*a* prior to applying a coating to the face 23*a*. In the illustrated embodiment, a flame treatment unit 31 can apply a flame and/or other suitable form of heat to a localized portion of the face 23*a* (e.g., can apply localized heat to the face 23*a*) while at least one of the base material 21 and the flame treatment unit 31 moves relative to the other (e.g., the flame treatment unit 31 can move in the direction of arrow A1 and/or the base material 21 can move in the direction of the arrow A2). In some exemplary embodiments, the flame can produce a surface temperature from about 200° F. to about 400° F. (about 90° C. to about 200° C.), about 150° F. to about 350° F. (about 65° C. to about 175° C.), about 150° F. to about 175° F. (about 65° C. to about 80° C.), about 300° F. to about 350° F. (about 150° C. to about 175° C.), or any suitable surface temperature. In an exemplary embodiment, as schematically shown in FIG. 1D, the base material 21 can be in the form of a web moving in a machine direction A2 past a flame treatment station, where the flame treating unit 31 treats the face 23*a*. In the present application, while the flame treating unit 31 may be described as moving in the direction of arrow A1 along/relative to the face 23*a* of the base material 21 and/or the base material 21 may be described as moving past/relative to the flame treating unit 31 (e.g., as schematically shown in FIG. 1D), it will be understood that either or both of the base material 21 and the flame treating unit 31 actually could be moving to result in the relative motion described.

As shown in FIG. 1B, as the flame treating unit 31 applies the localized flame/high heat to the face 23*a* of the base material 21 while moving in the direction A1 relative to the face 23*a* and/or while the base material 21 is moved in the direction A2, the fiber portions 25 extending from the face 23*a* are at least partially removed (e.g., burnished or burned away) from the surface such as by the plasma of the flame to form a treated face 23*b* (FIG. 1B) that is smoother than the face 23*a* prior to treatment and is at least partially free of stray fiber portions extending from the base material 21 at the treated face 23*b*. In one embodiment, the treated face 23*b* can be better prepared for coating and/or otherwise adding layers to the base material 21. The fiber portions 25 could be otherwise removed and/or the face 23*a* could be otherwise treated without departing from the disclosure.

As shown in FIG. 1C, a coating layer 33 can be added to the base material 21 to form the resultant coated material 35, which can be a packaging material or a precursor to or a portion of a packaging material. In the illustrated embodiment, the coating layer 33 can be applied to the treated face 23*b* to fully cover or at least partially cover the face 23*b*. In one embodiment, the base material 21 can move from the flame treatment station to a coating station where a coating apparatus (e.g., a coating roller, spray nozzles, and/or other suitable apparatus) can apply the coating layer 33 to the relatively smooth treated face 23*b*. For example, as schematically shown in FIG. 1D, a coating roller 36 can apply the coating layer 33 to the treated face 23*b*. Since the fiber portions 25 have been at least partially removed on the treated face 23*b*, there are few or no stray fibers that can extend through the coating layer 33. The coating layer 33 otherwise could be formed and/or applied without departing from the disclosure.

In exemplary embodiments, the system 20 schematically shown in FIG. 1D can include a supply (e.g., a roll) of a web of the base material 21, which can be fed from the supply and conveyed (e.g., by rollers and/or other suitable features, not shown) in the direction A2 (e.g., a downstream or machine direction A2) in a continuous and/or in a stepped operation. The base material 21 could be otherwise supplied, such as in discrete sheets by a suitable feeder, for example, without departing from the disclosure. As shown in FIG. 1D, the base material 21 can be moved through a treatment station in which the treatment unit 31 can be mounted relative to the base material 21 so that the face 23*a* is moved to a flame produced by the treatment unit 31 and directed toward the base material 21. As the face 23*a* moves under the treatment unit 31, the fiber portions 25 can pass through the plasma of the flame so that the fiber portions 25 extending from the face 23*a* are at least partially vaporized, burned away, and/or otherwise removed to form the treated face 23*b*. Subsequently, the base material 21 with the treated face 23*b* can be moved to a coating station in which a coating apparatus 36 (e.g., a roller as illustrated in FIG. 1D or any other suitable coating apparatus) applies the coating layer 33 to the treated face 23*b* of the base material 21 as the base material 21 is moved through the coating apparatus 36 in the machine direction A2. In embodiments, the resultant coated material 35 can be moved downstream from the coating apparatus 36 for further processing, cutting, storage, transport, etc.

The system 20 and the features thereof could be otherwise shaped, arranged, configured, and/or positioned without departing from the disclosure. For example, while one treatment unit 31 is shown in FIG. 1D, the system 20 could include any suitable number of treatment units 31. In exemplary embodiments, additional treatment units 31 can be added so that a particular dwell time of the material under the heat of the unit(s) can be maintained when increasing the speed that the material is conveyed in the system 20. For example, an alternative system that moves the material at twice the speed as the system 20 can have a second treatment unit to maintain the dwell time of the material.

In embodiments, the coating layer 33 can be a sealing layer (e.g., to waterproof the material, to form a water-resistant material, to form a grease barrier, etc.). In exemplary embodiments, the coating layer 33 can be polyethylene (PE) or another suitable petroleum-based polymer or could be a PE-replacement polymer that is not petroleum-based and/or that breaks down more easily after use (e.g., that is commercially compostable, is home compostable, and/or readily breaks down in marine and/or landfill environments). For example, the polymer could be polylactic acid (PLA), a polyhydroxyalkanoate (PHA), and/or polybutylene succinate (PBS). PLA is a bio-derived extrusion polymer that can be viscous, and its relatively high viscosity can help prevent fiber portions from protruding through the coating layer 33. However, the treatment of the base layer 21 to remove the stray fibers as described above can help further reduce fibers from the base layer 21 protruding in the coating layer. PBS is also an extrusion polymer and can be petroleum-based and/or bio-derived. PBS may be desirable in some embodiments due to its compostability in home compost systems. PHA is a bio-derived polymer that is highly degradable (e.g., relative to other polymers), is highly compostable (e.g., relative to other polymers), and has marine degradation characteristics.

In an exemplary embodiment, PHA can be applied to the face 23*a*/23*b* in an emulsion (e.g., a water-based emulsion) and can be dried and/or annealed to remove the water and leave the PHA coating on the face of the base layer 21. For example, a water-based emulsion including PHA (or another suitable polymer or any other suitable coating material) can be applied to the base layer 21 (e.g., by a coating roller, spray nozzles, and/or other suitable apparatus). Subsequently, the water-based emulsion can be annealed and/or otherwise modified to form the coating on the base layer. In embodiments, the water-based emulsion can be at least partially annealed by flame annealing with a flame treatment unit 31 (e.g., positioned downstream from the coating apparatus 36), wherein the localized heat from the flame treatment unit 31 can at least partially dry the water-based emulsion and cause the PHA or other polymer to coalesce into the coating. Alternatively, or in addition, the water-based emulsion can be annealed and/or otherwise modified with other suitable drying and/or heating apparatus and/or operations. In some embodiments, flame annealing the water-based emulsion with the flame treatment unit 31 can facilitate the formation of a more uniform coating surface from the polymer in the emulsion than other systems that do not include applying localized heat with a flame treatment unit 31. In embodiments, a PHA emulsion or other water based material may less viscous than other materials and may not be as good at knocking down stray fibers (e.g., PE, which can be more viscous, can better cover the stray fibers and prevent the stray fibers from extending through the PE coating). Accordingly, water-based materials and other lower viscosity materials can particularly benefit from removing stray fibers as described above.

In some embodiments, dive-in of water-based materials and/or other less viscous materials into the fibrous material of the base layer 21 can have a number of effects on the fibrous material (e.g., dive-in can result in a less suitable coating, can cause fibers to extend from the face 23*a*, can cause swelling of the fibrous material, etc.). In some embodiments, dive-in can be reduced or mitigated by adding sizing agents and/or other hydrophobic materials to the fibrous material. In an exemplary embodiment, the coating material (e.g., a PHA emulsion) can be applied to the face 23*a*/23*b* twice: a first application can be result in dive-in and can be followed by the flame treatment to remove the fiber portions 25, and then a second application of the coating material can form the coating layer 33. In embodiments, the coating material that was partially absorbed in the first application can help prevent dive-in in the second application.

Figure 2A:
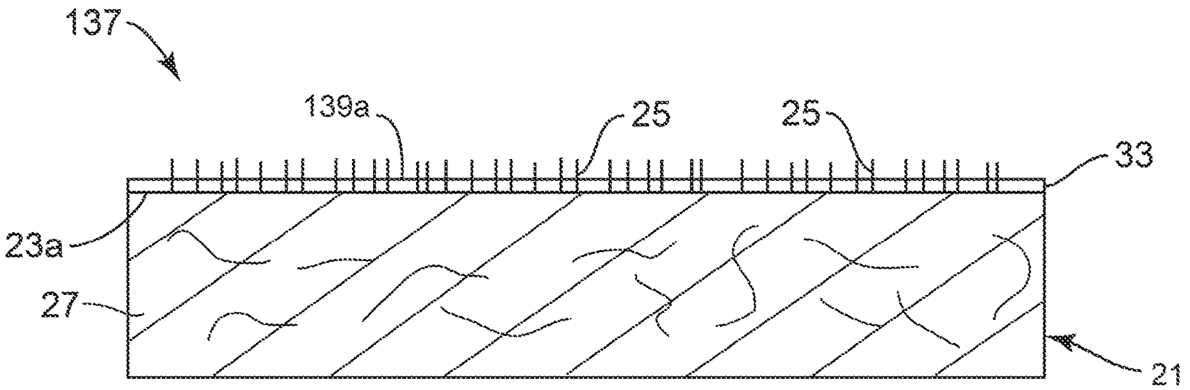
FIG. 2A is a schematic cross-sectional view of an initial coated material including the base material or substrate of FIG. 1A and a coating for being formed into a packaging material in accordance with a second exemplary embodiment of the disclosure.
Figure 2B:
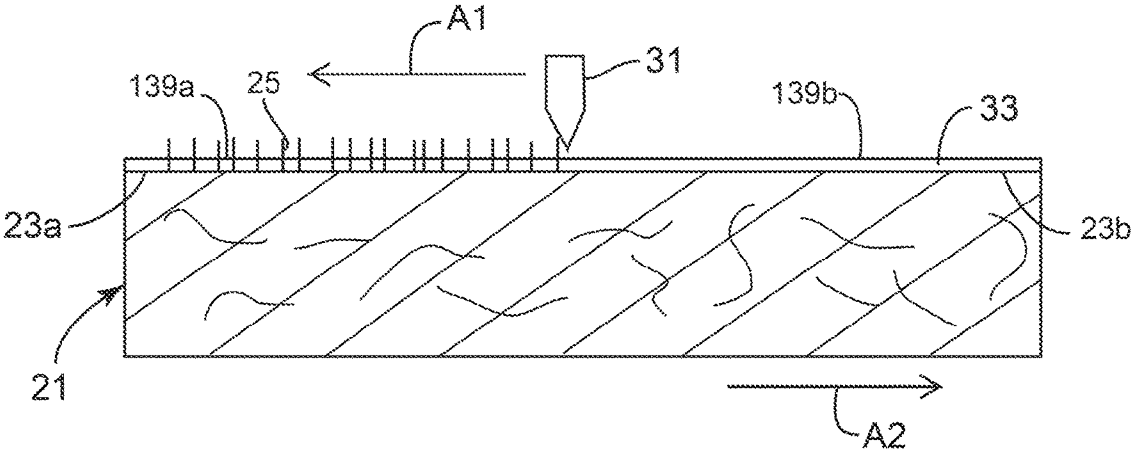
FIG. 2B is a schematic cross-sectional view of the initial coated material of FIG. 2A being treated with a treatment unit according to the second exemplary embodiment of the disclosure.
Figure 2C:
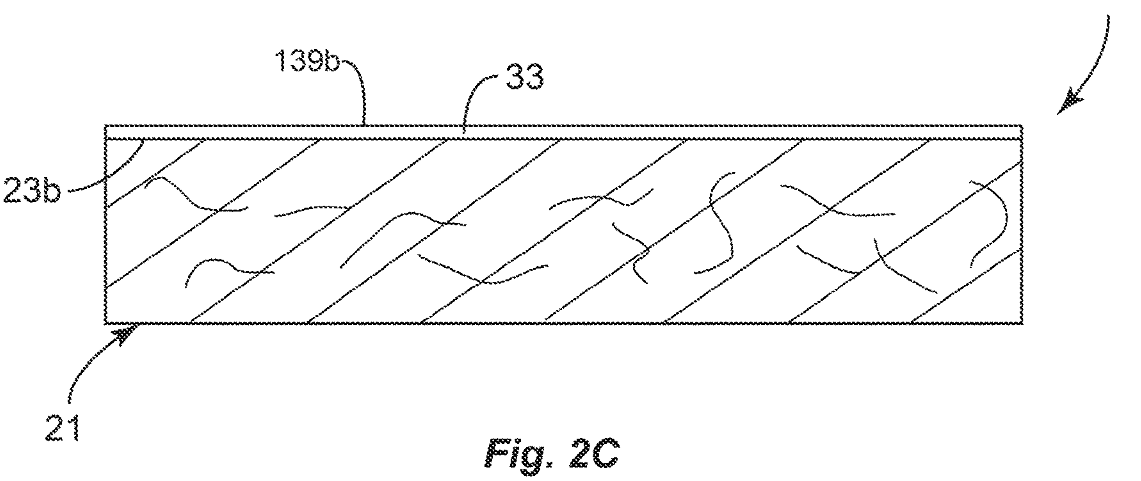
FIG. 2C is a schematic cross-sectional view of a resultant coated material formed from at least the base material of FIG. 2A in the system of FIG. 2B according to the second exemplary embodiment of the disclosure.
Figure 2D:
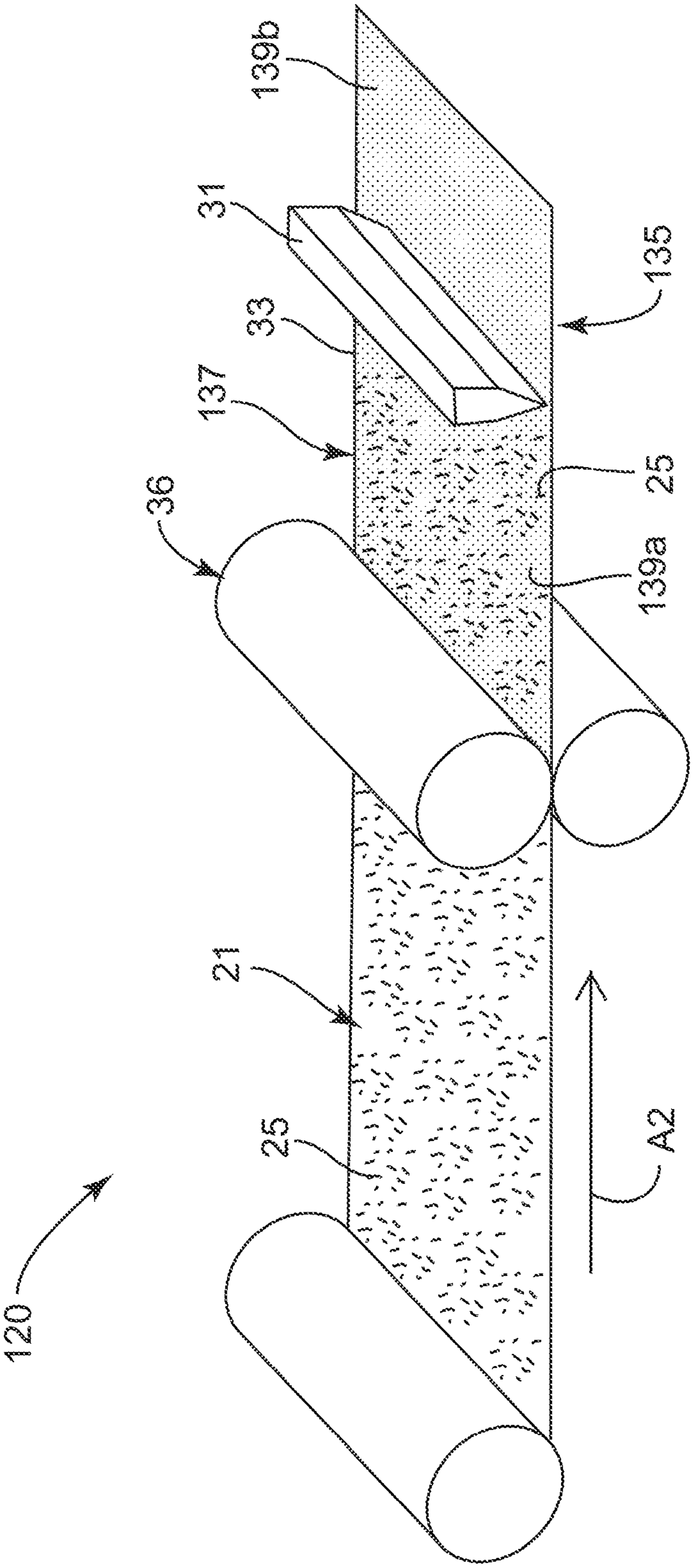
FIG. 2D is a schematic view of a system for forming an initial coated material and for treating the initial coated material material according to the second exemplary embodiment of the disclosure.

FIGS. 2A-2D schematically illustrate the formation of a resultant material 135 (schematically shown in FIG. 2C) according to a second embodiment of the disclosure. The second embodiment is generally similar to the first embodiment, except for variations noted and variations that will be apparent to one of ordinary skill in the art. Accordingly, similar or identical features of the embodiments have been given like or similar reference numbers. As shown in FIGS. 2A and 2D, the coating layer 33 is applied to the face 23*a* (e.g., the pretreatment face 23*a*) of the base layer 21 (e.g., as schematically shown in FIG. 1A) to form an initial coated material 137. For example, in the system 120 schematically shown in FIG. 2D, the base material 21 can be moved in the machine direction A2 from the supply through the coating apparatus 36 so that the coating layer 33 is applied to the pretreatment face 23*a* of the base layer 21, forming the initial coated material 137. In the illustrated embodiment, some fiber portions 25 can extend from the face 23*a* of the base layer 21 at least partially through the coating layer 33 and can extend from an outer surface 139*a* of the coating layer 33.

As schematically shown in FIGS. 2B and 2D, the initial coated material 137 can be treated with the flame treatment unit 31 as described above to reduce or at least partially eliminate the fiber portions 25 extending from the surface 139*a* as the flame treatment unit 31 moves in the direction of arrow A1 and/or the initial coated material 137 moves in the direction of the arrow A2. As described above, while the flame treatment unit 31 can be considered to be moving in the direction A1 along/relative to the initial coated material 137 and/or the initial coated material 137 may be described as moving past/relative to the flame treatment unit 31 (e.g., as schematically shown in FIG. 2D), it will be understood that the flame treatment unit 31 can be moving in the direction A1 and/or the initial coated material 137 can be moving in the direction A2 to result in the relative motion described in the present application. For example, as schematically shown in FIG. 2D, the initial coated material 137 can be conveyed from the coating apparatus 36 in the machine direction A2 past the flame treatment unit 31 so that the outer surface 139*a* of the initial coated material 137 is moved to the flame of the flame treatment unit 31.

As schematically shown in FIG. 2B, as the flame treating unit 31 applies the flame/high heat to the surface 139*a* of the coating layer 33 while moving in the direction A1 relative to the initial coated material 137 and/or while the initial coated material 137 is moved in the direction A2, the fiber portions 25 extending from the face 23*a* (and, potentially, through the coating layer 33) are at least partially removed (e.g., burnished or burned away) from the surface to form the treated face 23*b* of the base material 21 and to form the resultant surface 139*b* of the coating layer 33 (FIGS. 2B and 2C). The heat from the flame treatment unit 31 can also soften and/or melt a portion of the coating layer 33 and/or otherwise can make the coating material more malleable and/or more flowable as the surface of the material passes through the plasma of the flame treating unit 31. In an exemplary embodiment, this softening/melting of the coating material can cause the material to flow and/or otherwise move into openings or pinholes in the coating layer 33 left by the fiber portions 25 that were removed by the flame treatment unit 31. Accordingly, the flame treatment can modify the coating layer 33 such as to help seal the coating layer 33 and/or form a more uniform surface 139*a* in addition to removing the stray fibers to form the resultant surface 139*b* and the resultant coated material 135 (FIG. 2C).

In embodiments, the surface 139*a* can be heated to sufficient temperatures (e.g., including the temperatures described above) by the flame treatment unit 31 to vaporize the fiber portions 25 and to cause the coating layer 33 to become malleable/flowable and subsequently coalesce and smooth itself out. For example, a coating layer 33 comprising EVA could be heated to about 150° F. to about 175° F. (about 65° C. to about 80° C.) for malleability and coalescence. In another example, a coating layer 33 comprising bio-polymers could be heated to about 300° F. to about 350° F. (about 150° C. to about 175° C.) for malleability and coalescence.

In some embodiments, additional coating material and/or coating layers can be added to the coating layer 33 after treating the surface 139*a* with the flame treatment unit 31 to form the resultant surface 139*b*. As schematically shown in FIG. 1D, the resultant coated material 135 cam be conveyed downstream from the flame treatment unit 31 for further processing, cutting, storage, transport, etc. The system 120 and the features thereof could be otherwise shaped, arranged, configured, and/or positioned without departing from the disclosure. For example, the system 120 could include any suitable number of coating apparatus and/or treatment units.

The resultant coated materials formed in the embodiments described above can provide packaging materials with barrier properties using materials with desirable traits (e.g., renewable materials, compostable materials, etc.) and can use the materials efficiently while reducing and/or eliminating channels or pathways for oil, grease, water, and/or other materials to pass through the barrier layer. For example, the methods and systems of the above embodiments can reduce and/or eliminate stray fibers that can extend through the barrier layer and can wick fluids through the barrier layer. In alternative methods or systems that lack the flame treatment described above with respect to the first and second exemplary embodiments, a larger amount of coating material may be used to form the coating layer 33 and/or multiple coating layers can be added to help ensure that stray fibers (e.g., fiber portions 25) are adequately covered by the coating to form a seal or at least partially form a seal. However, such methods/systems are less efficient with respect to the use of the coating material and can be costlier. Accordingly, the removal of the fiber portions 25 by the flame treatment described with respect to the exemplary first and second embodiments can be more efficient in the use of the coating material and can save on costs.

In an exemplary embodiment, the opposing surface of the resultant coated materials could be coated in a similar or identical manner as described above in the exemplary embodiments and/or could be otherwise coated, laminated, etc. or could be left uncovered.

Any of the features of the various embodiments of the disclosure can be combined with, replaced by, or otherwise configured with other features of other embodiments of the disclosure without departing from the scope of this disclosure The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method for forming a resultant material, the method comprising:

obtaining a base material comprising a fibrous material with a plurality of fiber portions extending from a face of the base material;

treating the face of the base material using a first treatment comprising applying heat along at least a portion of the face to at least partially remove the plurality of fiber portions extending from the face;

applying a first polymer layer to the face of the base material;

treating the first polymer layer using a second treatment comprising applying heat along at least a portion of the first polymer layer; and applying a second polymer layer to the first polymer layer.

2. The method of claim 1, further comprising moving at least one of the base material and the treatment unit relative to the other during the treating at least the face of the base material.

3. The method of claim 1, further comprising moving the base material in a machine direction through a treatment station comprising a treatment unit that at least partially removes the plurality of fiber portions extending from the face.

4. The method of claim 3, further comprising moving the base material through a coating apparatus downstream from the treatment unit, and applying the first polymer layer to the face of the base material with the coating apparatus.

5. The method of claim 1, further comprising moving the base material in a machine direction through a coating apparatus, applying the first polymer layer to the face of the base material with the coating apparatus to form an initial coated material, and moving the initial coated material past a treatment unit that applies the heat along the at least the portion of the first polymer layer.

6. The method of claim 5, wherein at least some of the plurality of fiber portions extends at least partially through the first polymer layer after the applying the first polymer layer and wherein the applying heat along the at least the portion of the first polymer layer removes the at least some of the plurality of fiber portions and wherein the applying heat along the at least the portion of the first polymer layer causes at least a portion of the first polymer layer to at least partially move into spaces formed in the first polymer layer by the removing the at least some of the plurality of fiber portions.

7. The method of claim 5, wherein the applying heat along the at least the portion of the first polymer layer comprises applying a flame from the treatment unit to a surface of the first polymer layer.

8. The method of claim 1, wherein the first polymer comprises at least one of a renewable material, a compostable material, or a bio-derived material.

9. The method of claim 1, wherein the first polymer layer is applied via a water-based emulsion disposed on the face of the base material, wherein the water-based emulsion comprises a polymer, and wherein the water-based emulsion is at least partially dried to form the first polymer layer on the face of the base material.

10. The method of claim 1 wherein the first polymer layer comprises at least one of polylactic acid (PLA), polyhydroxyalkanoate (PHA), or polybutylene succinate (PBS).

11. The method of claim 1, wherein the first treatment is performed with a flame treatment unit, and the applying heat along at least a portion of the face of the base material comprises applying a flame from the flame treatment unit along at least a portion of the face of the base material.

12. A method for forming a resultant material, the method comprising:
- obtaining a base material comprising a fibrous material;
- applying a first polymer layer to a face of the base material to form an initial coated material; and
- treating the initial coated material by applying localized heat to the first polymer layer, and
- applying a second polymer layer on the first polymer layer.

13. The method of claim 12, wherein the applying localized heat to the first polymer layer causes the first polymer layer to at least partially coalesce.

14. The method of claim 12, wherein the applying the first polymer layer to the face of the base material comprises applying a water-based emulsion to the base material, the water-based emulsion comprising a polymer, and wherein the applying the localized heat to the first polymer layer at least partially dries the water-based emulsion and at least partially causes the polymer to coalesce.

15. The method of claim 14, wherein the first polymer layer comprises polyhydroxyalkanoate (PHA).

16. The method of claim 12, wherein fiber portions at least partially extend from the face of the base material, the fiber portions extending at least partially through the first polymer layer prior to the treating, and wherein the applying localized heat to the first polymer layer at least partially removes the fiber portions causing voids to form in the first polymer layer, wherein the applying localized heat causes at least a portion of the first polymer layer to at least partially fill the voids.

17. The method of claim 12, wherein the first polymer layer comprises at least one of a renewable material, a compostable material, or a bio-derived material.

18. The method of claim 12, wherein the applying the first polymer layer comprises moving the base material through a coating apparatus, and wherein the treating the initial coated material comprises moving the initial coated material in relation to a treatment unit.

* * * * *